United States Patent [19]

Katsumoto et al.

[11] 4,130,521
[45] Dec. 19, 1978

[54] DENSIFICATION OF POLYPYRROLIDONE

[75] Inventors: Kiyoshi Katsumoto, El Cerrito; Edward L. Nimer, San Rafael, both of Calif.

[73] Assignee: Chevron Research Company, San Francisco, Calif.

[21] Appl. No.: 790,777

[22] Filed: Apr. 25, 1977

[51] Int. Cl.² ............................................. C08G 20/16
[52] U.S. Cl. ................................. 528/326; 260/29.6 R; 264/118; 264/142; 264/176 F; 260/29.2 N; 528/502
[58] Field of Search ................................. 264/140–144, 264/118, 101, 205, 176 F, 349; 260/78 P, 29.6 R, 29.2 N

[56] References Cited

U.S. PATENT DOCUMENTS

| 2,994,105 | 8/1961 | Seal et al. | 264/143 |
| 3,213,066 | 10/1965 | Renfrew | 260/78 P |
| 3,324,061 | 6/1967 | Tanquary et al. | 260/29.2 N |
| 3,686,066 | 8/1972 | Peters | 260/78 P |
| 3,721,652 | 3/1973 | Barnes | 260/78 P |
| 3,804,813 | 4/1974 | Takamiya et al. | 260/78 P |
| 3,814,792 | 6/1974 | Arakawa et al. | 260/78 S |
| 3,988,401 | 10/1976 | Kasting et al. | 264/140 |

Primary Examiner—Jeffery R. Thurlow
Attorney, Agent, or Firm—Dix A. Newell; T. G. DeJonghe; Lawrence S. Squires

[57] ABSTRACT

Moisture-containing nylon-4 powder is treated under heat and pressure to produce a solid material of bulk density suitable for melt-spinning.

14 Claims, No Drawings

DENSIFICATION OF POLYPYRROLIDONE

BACKGROUND OF THE INVENTION

The alkaline-catalyzed/carbon dioxide bulk polymerization of 2-pyrrolidone with conversions of 30–40% or more, is known to produce a hard mass which, when chopped, washed and dried, is suitable for melt-spinning into fibers, or other processing (see U.S. Pat. No. 3,721,652). However, the continuous bulk polymerization of 2-pyrrolidone under agitation produces a finely comminuted product which is washed with water to remove both unreacted monomer and the alkaline catalyst. The polypyrrolidone product is then in the form of a wet powder containing about 50 weight percent water, based on polypyrrolidone. This powder is normally dried, but it has too low a bulk density for economical commercial processing, e.g., it is difficult to feed into an extruder for melt-spinning into filaments. Consequently, the dry powder is melt-extruded to form dense pellets which are suitable for feeding into extruders in melt-spinning processes. In the process of melt-extruding the polypyrrolidone to form dense pellets, its weight average molecular weight is degraded from a high initial value of about 200,000, or more, to a value of 35,000–100,000 or less, because of the well-known tendency of nylon-4 to decompose into its monomer upon melting. U.S. Pat. No. 3,814,792 uses an alcohol/water solvent at elevated temperature to dissolve a polypyrrolidone composition for extrusion. U.S. Pat. No. 3,686,066 discusses the molding of solid nylon-4 articles from water-swollen polypyrrolidone containing 100% or more of water, based on the weight of polypyrrolidone, by applying heat and pressure to the swollen mass. U.S. Pat. No. 3,324,061 teaches the use of elevated temperatures and pressures to dissolve polypyrrolidone in water for dry spinning. It is an object of the present invention to provide a means of increasing the bulk density of polypyrrolidone without substantially degrading its molecular weight.

BRIEF SUMMARY OF THE INVENTION

A method of treating polypyrrolidone powder by compressing the powder having a water content of about 5–60 weight percent, based on polypyrrolidone, under pressure and temperature sufficient to produce solid polypyrrolidone having a dry bulk density suitable for feeding an extruder in a melt-spinning process.

DESCRIPTION OF PREFERRED EMBODIMENTS

The continuous polymerization of 2-pyrrolidone under agitation, or stirring, produces, at normal conversions, a mixture of finely divided polymer and unreacted monomer. If the mixture is washed and dried, the product is a dry powder which is unsuitable for further processing because of its low bulk density and concomitant handling and extruder feeding difficulties. In the process of the present invention, the fines are washed with water and dried to reduce the water content of the powdery product to about 5–60 weight percent water, based on the weight of polypyrrolidone, preferably about 10–40 weight percent water, and most preferably 10–30 weight percent water. This moisture-containing powder is then subjected to compression under sufficient pressure and temperature to produce solid polypyrrolidone having a suitable bulk density for feeding an extruder in a melt-spinning process.

The maximum temperature of the polypyrrolidone during compression is always well below its melting point; consequently, degradation of the polymer to monomer does not occur rapidly. The monomer content of the dried product of this process is normally less than about 0.2 weight percent, which is appreciably better than that obtainable from melt-extrusion pelletizing of the powder without further treatment. The temperature selected for the polypyrrolidne during compression is inversely proportional to its water content. At the lower water contents employed, about 10%, higher temperatures of about 150° C or greater are preferred. At the higher water contents employed, about 40%, lower temperatures of 100° C or less may be utilized, i.e., even as low as about 50° C. Generally, maximum temperatures of about 75°–225° C, preferably about 100°–200° C, and pressures of 50 psi–300 psi are preferred for compression densification of polypyrrolidone in this process. The moisture content of the compressed polymer is generally in the range of 5–40% by weight based on polypyrrolidone. This moisture is removed by drying at temperatures of about 100°–150° C, and optionally, under reduced pressures of about 1–5 torr.

The polypyrrolidone powder which forms the starting material of this process may be any particulate product of polymerizing or copolymerizing 2-pyrrolidone. Preferably 90 weight percent of the powder is of screen size greater than about No. 200 (0.07 mm) U.S. Standard Seive and less than about No. 3 (6 mm) U.S. Standard Sieve, more preferably No. 40 (0.4 mm)-No. 10 (2mm) U.S. Standard Sieve. The product of this process is characterized as solid polypyrrolidone having a dry bulk density suitable for melt-spinning, that is, a bulk density of about 20–50 lbs/ft$^3$, i.e. 20–50 $\times$ 0.016 g/cc, or about 0.3–0.8 g/cc, preferably about 30–50 lbs/ft$^3$ and most preferably about 40 lbs/ft$^3$. "Dry bulk density" refers to the bulk density of the solid polypyrrolidone having a water content of less than about 1 weight percent. The product is obtained as pellets, or kibbles, from a pellet mill, or as sheets or films from a 2-roll mill, having any shape or thickness suitable for later comminution, drying and processing. The moisture content of the dried compressed polypyrrolidone will usually be less than about 1 weight percent, preferably less than about 0.5 weight percent. Composite products, useful for later processing, can be provided by adding materials such as other polyamides, e.g., nylon-6, pigments, whiteners, e.g., such as titanium dioxide, antioxidants, ultra-violet stabilizers, thermal stabilizers, such as the epoxides, etc., etc., to the wet powder before compression.

EXEMPLIFICATION

EXAMPLE 1

Polypyrrolidone powder of 170,000 weight average molecular weight, containing 22% by weight of water, was compacted by forcing the powder through the holes of a die of a kibble mill. The size of the holes was ⅛ inch in diameter by 1½ inches long. The powder was heated by mechanical mixing, fused into a hardened cylindrical shape and cut into 3/16 inch lengths at the die holes by a doctor blade. Kibble temperatures were about 80° C as measured by a thermometer in the receiver. A smooth surfaced kibble wth irregular ends and 19% water content was thus formed. The bulk density of the kibble was 37 lbs/ft³ after drying to less than 0.1 weight percent water. The molecular weight of the kibble was the same as that of the polymer powder fed to the mill.

EXAMPLE 2

Polypyrrolidone powder of 290,000 weight average molecular weight (10–200 mesh) containing 37 weight percent water (based on polypyrrolidone) was subjected to compaction by passing it through a 2-roll mill. Roll surface temperature was about 148°–154° C. The polymer was compressed into dense sheets appoximately 1/16–3/32 inch thick which had 19% water content. The sheets were chopped into approximately ⅛ inch by ⅛ inch granules and dried. The particle density of these granules was approximately 62 lbs/ft³ and the average bulk density was about 32 lbs/ft³. The molecular weight of the granules was identical to that of the starting polymer powder.

What is claimed is:

1. A method for reducing the water content and improving the bulk density of finely powdered polypyrrolidone to facilitate the melt extrusion thereof, which comprises compressing powdered polypyrrolidone, having a water content of about from 5–60% by weight, at a temperature of at least about 50° C but below the melting point of polypyrrolidone and a pressure of about from 50 to 300 psi, thereby yielding a solid polypyrrolidone product having a dry bulk density in the range of about from 20–50 pounds per cubic foot.

2. A method according to claim 1 wherein said powder has a water content of about 10–40 weight percent.

3. A method according to claim 1 wherein said powder has a water content of about 10–30 weight percent and said solid polypyrrolidone has a dry bulk density of about 30–50 pounds per cubic foot.

4. The process of claim 1 wherein said polypyrrolidone powder is compressed at a temperature in the range of about from 75°–275° C.

5. A method according to claim 4 wherein said said powder has a water content of about 10–40 weight percent, is compressed at 100°–200° C and said solid polypyrrolidone has a dry bulk density of about 20–50 pounds per cubic foot.

6. A method according to claim 4 wherein said powder has a water content of about 10–30 weight percent and said solid polypyrrolidone has a dry bulk density of about 30–50 pounds per cubic foot.

7. The process of claim 1 wherein said polypyrrolidone powder has a particle size in the range of about from U.S. standard sieve No. 200 to No. 3.

8. A method according to claim 7 wherein said powder has a water content of about 10–40 weight percent.

9. A method according to claim 7 wherein said powder has a water content of about 10–30 weight percent and said solid polypyrrolidone has a dry bulk density of about 30–50 pounds per cubic foot.

10. A solid polypyrrolidone produced by the process of claim 4.

11. A solid polypyrrolidone having a bulk density of about 20–50 pounds per cubic foot produced according to the process of claim 7.

12. The process of claim 1 wherein said polypyrrolidone powder is compressed by extrusion through a kibble die mill thereby yielding a kibble product.

13. The polypyrrolidone kibble product of the process of claim 12.

14. A method of melt spinning powdered pyrrolidone having an initial water content in the range of about from 5 to 60 percent, by weight, based on the weight of polypyrrolidone, which comprises the steps of:
  (a) compressing said polypyrrolidone at a temperature of at least 50° C but below the melting point of polypyrrolidone and a pressure of about from 50 to 300 psi thereby yielding a solid polypyrrolidone product having a bulk density in the range of about from 20–50 pounds per cubic foot;
  (b) drying said polypyrrolidone product of step (a) to reduce the water content thereof to about from 0.5 to 1 percent, by weight, based on the weight of said polypyrrolidone; and
  (c) feeding said dried polypyrrolidone to a melt spinning extruder and melt extruding said polypyrrolidone into filaments.

* * * * *